United States Patent
Horbatt

(10) Patent No.: US 10,383,156 B2
(45) Date of Patent: Aug. 13, 2019

(54) OPERATING A MOBILE HOTSPOT AT A VEHICLE

(71) Applicant: GM Global Technology Operations LLC, Detroit, MI (US)

(72) Inventor: Kevin R. Horbatt, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 327 days.

(21) Appl. No.: 14/946,455

(22) Filed: Nov. 19, 2015

(65) Prior Publication Data

US 2017/0150531 A1    May 25, 2017

(51) Int. Cl.
| | |
|---|---|
| *B60L 53/30* | (2019.01) |
| *B60L 53/60* | (2019.01) |
| *H04W 24/02* | (2009.01) |
| *H04W 76/10* | (2018.01) |
| *H04W 84/00* | (2009.01) |

(52) U.S. Cl.
CPC ............ *H04W 76/10* (2018.02); *B60L 53/30* (2019.02); *B60L 53/60* (2019.02); *H04W 24/02* (2013.01); *B60Y 2200/90* (2013.01); *B60Y 2200/91* (2013.01); *B60Y 2200/92* (2013.01); *H04W 84/005* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
CPC ............ H04W 76/02; H04W 52/0206; H04W 52/0277; H04W 48/12; H04W 84/12; H04W 84/005; B60L 11/1824; B60L 11/1838; B60Y 2200/91; B60Y 2200/92; B60W 40/08; B60W 2560/00; B60N 2/002; G07C 5/085; H04L 63/083; Y02B 60/50

See application file for complete search history.

(56) References Cited

U.S. PATENT DOCUMENTS

| | | | |
|---|---|---|---|
| 2014/0269463 A1* | 9/2014 | Miryala ............... | H04W 48/12 370/311 |
| 2014/0269466 A1* | 9/2014 | Owens ............... | H04W 52/0206 370/311 |
| 2015/0210287 A1* | 7/2015 | Penilla ............... | B60W 40/08 701/49 |

OTHER PUBLICATIONS

Ellipsis jetpack, Verizon, 2013 https://scache.vzw.com/multimedia/mim/ellipsis-jetpack-um/ellipsis-jetpack-um.pdf.*
JPH10309002A Matsui, machine translated https://patents.google.com/patent/JPH10309002A/en?oq=JPH10309002A.*

* cited by examiner

*Primary Examiner* — Jianxun Yang
(74) *Attorney, Agent, or Firm* — Reising Ethington P.C.; David Willoughby

(57) ABSTRACT

A system and method of operating a mobile hotspot at a vehicle. The system involves use of a vehicle that includes a battery and a charging port, wherein the charging port connects the vehicle to an external power source and is electrically connected to the battery to provide the battery with electrical power from the external power source when connected; a wireless access point, wherein the access point is powered by the battery in the vehicle and wherein the access point wirelessly provides Internet access to one or more wireless devices located in or within a proximity of the vehicle; and a controller, wherein the controller enables operation of the access point while the vehicle is powered off when the vehicle is connected to the external power source via the charging port.

12 Claims, 4 Drawing Sheets

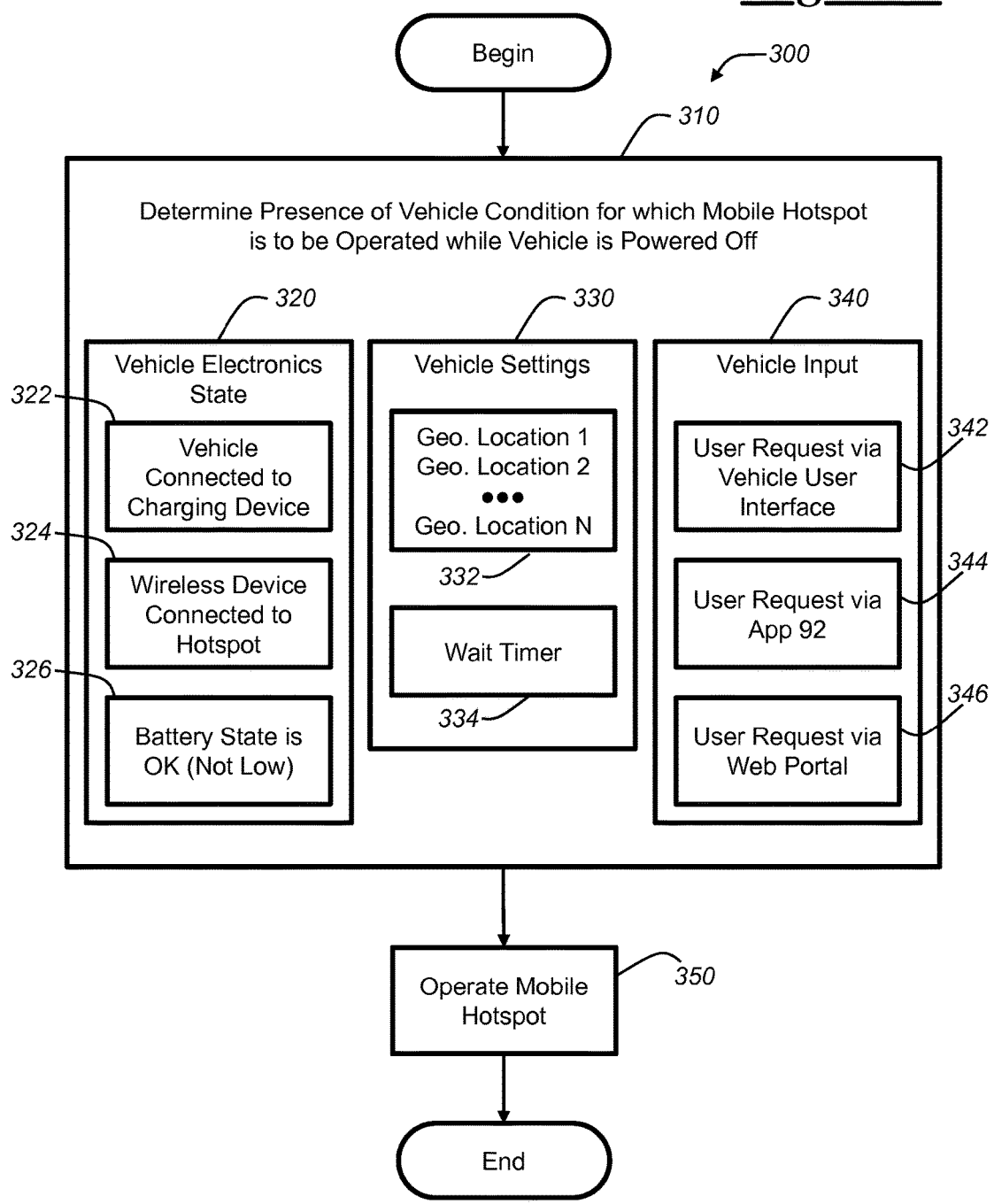

OPERATING A MOBILE HOTSPOT AT A VEHICLE

TECHNICAL FIELD

The present invention relates to operation of mobile hotspots at vehicles generally and, more particularly, to operating a mobile hotspot at a vehicle when the vehicle is powered off.

BACKGROUND

Recently, many hybrid and electric vehicles have been developed. Hybrid vehicles achieve propulsion using a gas-powered combustion engine and an electric battery while electric vehicles achieve propulsion solely using an electric battery. In many hybrid vehicles (e.g., plug-in electric hybrids (PHEVs)), and nearly all electric vehicles (e.g., battery electric vehicles (BEVs) and grid electric vehicles (GEVs)), the electric battery of these vehicles can be charged using an external power source wherein the external power source plugs into the vehicle (or vice versa). It is desirable for owners of vehicles with plug-in battery charging capabilities to have an external power source at their home or other places where a vehicle may be kept. Additionally, there are a growing number of public charging stations (i.e. locations with external power sources) whereat vehicle batteries can be charged.

Another emerging area of technology in the automotive industry is the incorporation of computer systems into vehicles. Such computer systems may control the operation of vehicle components (e.g., the body control module), while others may allow the vehicle to communicate with remote locations (e.g., using a telematics module via cellular communication) or locally with other devices via short-range wireless communications. Some vehicles now come equipped with mobile hotspot capabilities such that nearby devices can connect to the Internet or other network via a router that is incorporated into the vehicle.

SUMMARY

According to an embodiment of the invention, there is provided a method of operating a mobile hotspot at a vehicle, wherein the vehicle includes vehicle electronics that include a mobile hotspot which operates to provide wireless connectivity for one or more non-vehicle wireless devices located in the vehicle or within a proximity of the vehicle. The method is carried out by the vehicle electronics and comprises the steps of: (a) determining a vehicle condition for which the mobile hotspot is to be operated while the vehicle is powered off, wherein the determination comprises carrying out at least one of the following steps (a1)-(a3): (a1) determining (i) that a vehicle battery used to power the mobile hotspot is being charged, (ii) that at least one of the one or more non-vehicle wireless devices are connected to the mobile hotspot, (iii) that the vehicle battery is not in a low battery state, or any combination of (i)-(iii); (a2) determining that the vehicle is at a predetermined geographic location and/or that the vehicle has been powered off for less than a predetermined wait time; and (a3) receiving a user request for operation of the mobile hotspot via a vehicle user interface located in the vehicle or via wireless communication to the vehicle; and (b) operating the mobile hotspot while the vehicle is powered off based on the determination in step (a).

According to another embodiment of the invention, there is provided a method of controlling operation of a mobile hotspot at a vehicle, comprising the steps of: (a) operating a mobile hotspot at the vehicle while the vehicle is powered on, wherein the vehicle includes vehicle electronics that include the mobile hotspot which provides wireless connectivity for one or more non-vehicle wireless devices located in the vehicle or within a proximity of the vehicle; (b) subsequently after step (a), maintaining operation of the mobile hotspot for a period of time after the vehicle is powered off; (c) detecting that the vehicle is connected to an external power source during step (b); and (d) continuing to operate the mobile hotspot in response to step (c).

According to another embodiment of the invention, there is provided a vehicle that operates a mobile hotspot. The vehicle includes vehicle electronics installed in the vehicle which comprise a vehicle battery, charging port, wireless access point, and controller. The vehicle battery provides electric power to at least some portions of the vehicle electronics. The charging port connects the vehicle to an external power source and is electrically coupled to the battery to charge the battery with electrical power from the external power source when connected. The access point is powered by the battery in the vehicle and provides Internet access to one or more wireless devices located in or within a proximity of the vehicle. The controller enables operation of the access point while the vehicle is powered off and connected to the external power source via the charging port.

BRIEF DESCRIPTION OF THE DRAWINGS

One or more embodiments of the invention will hereinafter be described in conjunction with the appended drawings, wherein like designations denote like elements, and wherein:

FIG. 4 is a flowchart illustrating another method of operating a mobile hotspot at a vehicle.

DETAILED DESCRIPTION OF THE ILLUSTRATED EMBODIMENT(S)

The system and methods described below may be used in the operation of a mobile hotspot at a vehicle. A vehicle "mobile hotspot" is a wireless access point that provides wireless devices at or near the vehicle with wireless data connectivity to computing or information resources. Those resources may be remotely located computers or other devices, such as servers accessible over the Internet. Or, they may be local such as a vehicle infotainment unit installed in the vehicle that provides entertainment content via the mobile hotspot. In the illustrated embodiment, the vehicle includes a mobile hotspot in the form of a wireless router, and further includes a controller, telematics unit, battery, and charging port such that the battery can be charged by an external power source. In turn, the vehicle battery powers some or all of the vehicle electronics including the wireless router and controller. The router provides Internet access via communication of the telematics unit with cellular towers through one or more suitable protocols. The router may then allow devices to connect to it thereby providing the devices with a connection to the Internet.

The methods disclosed herein determine whether to operate the hotspot based on whether the vehicle is powered off and/or other vehicle conditions such as the vehicle's geographic location and whether the vehicle is connected to an external power source. In one example of the illustrated embodiment, a vehicle operator may desire to have access to the Internet at a residence owned by the vehicle operator, wherein the residence may not otherwise have Internet connection capabilities. Upon arriving at the residence, the operator may turn the vehicle off and this may be detected by the vehicle. Subsequently, the vehicle operator may plug an external power source (located at the residence) into the vehicle, whereby the vehicle may detect that it is connected to the external power source. Now, provided that the external power source is providing sufficient power to the vehicle battery, the vehicle can operate the mobile hotspot thereby providing Internet access to one or more wireless devices at, or nearby, the operator's residence, such as a desktop computer located within the residence. Apart from detecting charging from an external power source, maintaining or terminating operating of the mobile hotspot may be carried out based on other factors (vehicle conditions) such as whether there is a device using the hotspot when the vehicle is powered off, the battery state of charge, the vehicle's location, the receipt of a user request to operate the hotspot, or other user-configurable or vehicle-detectable conditions.

System—

Figure 1:
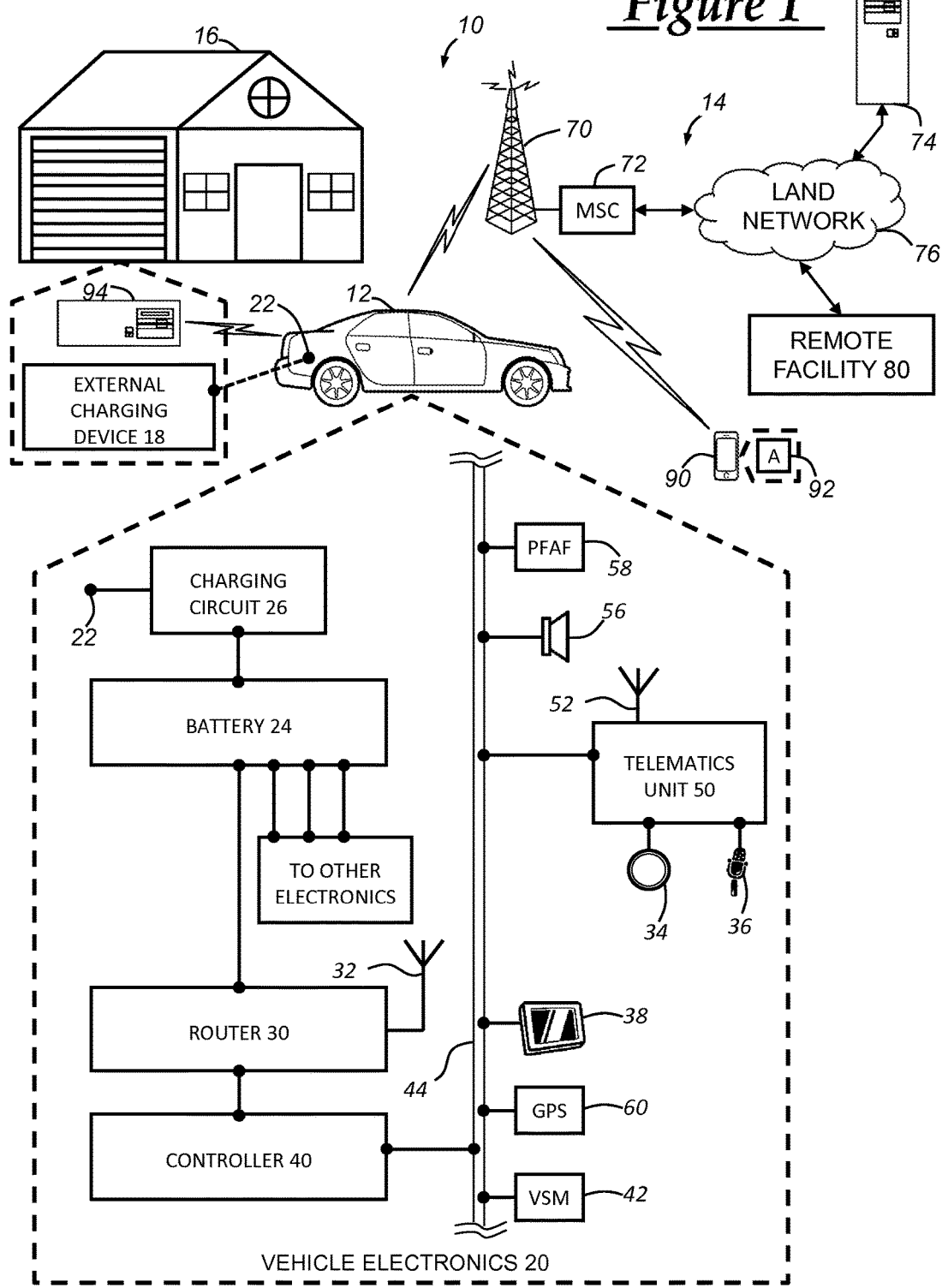
FIG. 1 is a block diagram depicting an embodiment of a system for operating a mobile hotspot at a vehicle and a communications system that is capable of utilizing the methods disclosed herein.

With reference to FIG. 1, there is shown an embodiment of a system 10 for operating a mobile hotspot at a vehicle. System 10 is capable of utilizing the methods disclosed herein to operate the mobile hotspot under certain conditions while the vehicle is powered off. System 10 generally includes a vehicle 12, a wireless communication system 14, a building or other location 16, an external charging device 18, and one or more wireless devices 90 or 94. Vehicle 12 includes vehicle electronics 20 which includes all of the electronics needed to operate the vehicle, some of which are shown in FIG. 1. For an electric or hybrid electric vehicle, this includes the electric powertrain used to propel the vehicle. Communication system 14 includes a plurality of cell towers 70 (only one shown), one or more mobile switching centers (MSCs) 72 (only one shown), a land network 76, a remote facility 80, and a computer 74. It should be appreciated that the disclosed methods can be used with any number of different systems and are not specifically limited to the operating environment shown here. Thus, the following paragraphs simply provide a brief overview of one such system 10; however, other systems not shown here could employ the disclosed methods as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a charging port 22, a vehicle battery 24, a charging circuit 26, a router 30, a controller 40, a telematics unit 50, a GPS module 60, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Battery 24 may be an electric vehicle battery that is capable of powering at least part of vehicle electronics 20 including the router 30, controller 40, and telematics unit 50. Battery 24 may also be used to provide propulsion of vehicle 12. Battery 24 may be a lead-acid battery, nickel metal hydride battery, sodium ("zebra") battery, lithium ion battery, or any other type of suitable battery. Battery 24 is connected to charging port 22 via charging circuit 26 allowing battery 24 to be charged by an external power source connected to the charging port. If used, charging circuit 26 may be included in charging port 22, in the battery 24, or between these two devices to convert or otherwise condition the externally-provided power for proper charging of the battery. Suitable circuitry for this purpose will be known by those skilled in the art. In general, charging port 22 may be any charging port that is capable of receiving power from an external power source (such as external charging device 18). Charging port 22 may be a wired connection whereby the battery is charged by physically plugging a wired connector from the external charging device 18 into charging port 22. Or, charging port 22 may comprise an antenna or pickup coil designed for inductive charging or other type of power transfer that does not require a physical connection.

Wireless router 30 operates as the mobile hotspot for vehicle 12 and can be an OEM-installed (embedded) or aftermarket device that is installed in the vehicle and that may direct traffic between one or more devices, namely for directing traffic between one or more wireless devices 90 (or 94) and the Internet. Router 30 may be operatively connected to telematics unit 50 (or even integrated therein), thereby enabling router 30 to communicate with remote devices and/or establish an Internet connection via sending and receiving data transmissions over one or more wireless protocols described below with respect to telematics unit 50. Router 30 includes an internal or external antenna 32 thereby enabling router 30 to transmit and receive wireless signals to and from devices 90 and 94. Router 30 is powered by battery 24 and may include an internal backup battery (not shown). Router 30 may be connected to bus 44 thereby allowing router 30 to provide Internet (or other network) connectivity to any device also connected to bus 44. Controller 40 is connected to router 30 and controls operation of the router according to the illustrated methods of FIGS. 2, 3, and 4.

Controller 40 may be part of router 30 or may be a separate stand-alone module. Controller 40 may be directly wired to router 30, wired to bus 44, and/or may be a wireless controller. Controller 40 includes a processor, memory, software, and interface circuitry to interact with router 30 and devices over bus 44. The processor and memory enable the controller to implement software or firmware installed thereon. Controller 40 carries out various vehicle functions, namely functions used to operate router 30. For example, router 30 may be powered on, powered off, reset, or possibly set to a low-power standby mode or other mode by controller 40. In addition, if controller 40 is connected to bus 44, controller 40 may control operations of other various electronic components that are also connected to bus 44. In this regard, controller 40 may be integrated in with another portion of vehicle electronics 20 and need not be a dedicated module used only for controlling router 30.

Telematics unit 50 can be an OEM-installed (embedded) or aftermarket device that is installed in the vehicle and that enables wireless voice and/or data communication over communication system 14 and via wireless networking. This enables the vehicle to communicate with remote facility 80, devices 90, other telematics-enabled vehicles, or some other entity or device. The telematics unit preferably uses radio transmissions to establish a communications channel (a voice channel and/or a data channel) with communication system 14 so that voice and/or data transmissions can be sent and received over the channel. By providing both voice and data communication, telematics unit 50 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the remote facility 80) and data communication (e.g., to provide GPS location data or vehicle diagnostic data to the remote facility 80), the system can utilize a single call over a voice channel and switch as needed between voice and data transmission over the voice channel, and this can be done using techniques known to those skilled in the art.

According to one embodiment, telematics unit 50 utilizes cellular communication according to either GSM, CDMA, LTE, VoLTE, or any other suitable standard and thus includes a cellular chipset (not shown) for voice communications like hands-free calling, a wireless modem for data transmission, an electronic processing device (not shown), one or more digital memory devices (not shown), and an antenna 52. It should be appreciated that the modem can either be implemented through software that is stored in the telematics unit and is executed by the processor, or it can be a separate hardware component located internal or external to telematics unit 50. The modem can operate using any number of different standards or protocols such as LTE, EVDO, CDMA, GPRS, and EDGE. Wireless networking between the vehicle and other networked devices can also be carried out using telematics unit 50. For this purpose, telematics unit 50 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can be set up to automatically receive an assigned IP address from another device on the network such as a router or from a network address server.

Telematics unit 50 can be used to provide a diverse range of vehicle services that involve wireless communication to and/or from the vehicle. Such services include: turn-by-turn directions and other navigation-related services that are provided in conjunction with the GPS-based vehicle navigation module 60; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, video games and/or other information is downloaded by an infotainment module (not shown) and is stored for current or later playback. The above-listed services are by no means an exhaustive list of all of the capabilities of telematics unit 50, but are simply an enumeration of some of the services that the telematics unit is capable of offering. Furthermore, it should be understood that at least some of the aforementioned modules could be implemented in the form of software instructions saved internal or external to telematics unit 50, they could be hardware components located internal or external to telematics unit 50, or they could be integrated and/or shared with each other or with other systems located throughout the vehicle, to cite but a few possibilities. In the event that the modules are implemented as VSMs 42 located external to telematics unit 50, they could utilize bus 44 to exchange data and commands with the telematics unit.

GPS module 60 receives radio signals from a constellation of GPS satellites (not shown). From these signals, the module 60 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 60), or some or all navigation services can be done via telematics unit 50, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 74, for other purposes, such as fleet management. Also, new or updated map data can be downloaded to the GPS module 60 from the remote facility 80 via the telematics unit 50.

Apart from the GPS module 60, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 50, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 20 also includes a number of vehicle user interfaces that provide vehicle occupants with a means of providing and/or receiving information, including pushbuttons(s) 34, microphone 36, visual display 38, audio system 56, and pedestrian friendly alert function (PFAF) 58. As used herein, the term 'vehicle user interface' broadly includes any suitable form of electronic device, including both hardware and software components, which is located on the vehicle and enables a vehicle user to communicate with or through a component of the vehicle. Microphone 36 provides audio input to the telematics unit to enable the driver or other occupant to provide voice commands and carry out hands-free calling via the communication system 14. For this purpose, it can be connected to an on-board automated voice processing unit utilizing human-machine interface (HMI) technology known in the art. The pushbutton(s) 34 allow manual user input into the telematics unit 50 to initiate wireless telephone calls and provide other data, response, or control input. Separate pushbuttons can be used for initiating emergency calls versus regular service assistance calls to the remote facility 80. Audio system 56 provides audio output to a vehicle occupant and can be a dedicated, stand-alone system or part of a primary vehicle audio system. According to the particular embodiment shown here, audio system 56 is operatively coupled to communications bus 44 and can provide sound from sources such as AM, FM and satellite radio, CD, DVD and other multimedia sources. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless communication system 14 may be a cellular carrier system that includes a plurality of cell towers 70 (only one shown), one or more mobile switching centers (MSCs) 72 (only one shown), as well as any other networking components required to connect cell towers 70 with land network 76. Each cell tower 70 includes sending and receiving antennas and a base station, with the base stations from different cell towers being connected to the MSC 72 either directly or via intermediary equipment such as a base station controller. Communication system 14 can implement any suitable communications technology, including for example, analog technologies such as AMPS, or the newer digital technologies such as LTE, EVDO, CDMA, GPRS, and EDGE. As will be appreciated by those skilled in the art, various cell tower/base station/MSC arrangements are possible and could be used with communication system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using cell towers 70 and MSCs 72, communication system 14 could be implemented as a different wireless carrier system in the form of satellite communication that can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the transmitting station, packaged for upload, and then sent to the satellite, which broadcasts the programming to subscribers. Bi-directional communication can be, for example, satellite telephony services using one or more satellites to relay telephone communications between the vehicle 12 and the uplink station. If used, this satellite telephony can be utilized either in addition to or in lieu of communication system 14.

Land network 76 may be a conventional land-based telecommunications network that is connected to one or more landline telephones and connects cell towers 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof. Furthermore, remote facility 80 need not be connected via land network 76, but could include wireless telephony equipment so that it can communicate directly with a wireless network.

Computer 74 can be one of a number of computers accessible via a private or public network such as the Internet. Each such computer 74 can be used for one or more purposes, such as a web server accessible by the router 30 via telematics unit 50 and cell towers 70. Other such accessible computers 74 can be, for example: a service center computer where diagnostic information and other vehicle data can be uploaded from the vehicle via the telematics unit 50; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or remote facility 80, or both. A computer 74 can also be used for providing Internet connectivity such as DNS services or as a network address server that uses DHCP or other suitable protocol to assign an IP address to the vehicle 12.

Remote facility 80 is designed to provide the vehicle electronics 20 with a number of different system back-end functions. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

The wireless devices 90 and 94 are non-vehicle devices, meaning that they are not a part of vehicle 12 or vehicle electronics 20. Both devices 90 and 94 may also be referred to as an "external device" since they are external to vehicle electronics 20, regardless of whether they may be located inside or outside the vehicle at any one time. The wireless devices 90 and 94 include: hardware, software, and/or firmware enabling cellular telecommunications and/or short range wireless communication (SRWC), as well as other wireless device functions and applications. The hardware of the wireless devices 90 and 94 comprises: a processor and memory for storing the software, firmware, etc. This memory may include both volatile RAM or other temporary powered memory, as well as a non-transitory computer readable medium that stores some or all of the software needed to carry out the various external device functions discussed herein. The wireless device processor and software stored in the memory enable various software applications, which may be preinstalled or installed by the user (or manufacturer) (e.g., having a software application or graphical user interface (GUI)). This may include a wireless device application 92 via which a vehicle user can communicate with the vehicle 12 and/or control various aspects or functions of the vehicle—e.g., among other things, allowing the user to remotely lock/unlock vehicle doors, turn the vehicle ignition on or off, check the vehicle tire pressures, fuel level, oil life, etc. The application 92 may also be used to enable the user of device 90 to activate or de-activate operation of the mobile hotspot from the device 90. Wireless device 90 is shown as a smartphone having cellular telephone capability and wireless device 94 is shown as a desktop computer. In other embodiments, device 90 or 94 may be a tablet, laptop computer, or any other suitable device. In addition, the application 92 may also allow the user to connect with the remote facility 80 or call center advisors at any time.

Location 16 is depicted as a residential building that includes an external charging device 18 and wireless device 94; however, location 16 may be any location that includes an external charging device 18. External charging device 18 may be any type of device that is capable of providing power to vehicle 12. In some embodiments, external charging device will contain a cord that is designed to be connected to vehicle 12 via engagement of a connector at the end of the cord and charging port 22. The external charging device may be connected to a power line wherein it receives electrical energy that can then be used to power battery 24 through charging port 22. External charging device 18 may be a typical electrical outlet, such as those normally found in a residence. In another embodiment, external charging device 18 may include an AC/DC converter and/or may be a standalone dedicated vehicle charging station located at a residence or elsewhere. Further, as mentioned above, the external charging device 18 may connect to the vehicle charging port 22 using inductive coupling or other wireless power transfer whereby a physical connection to port 22 is not needed.

Method—

Figure 2:
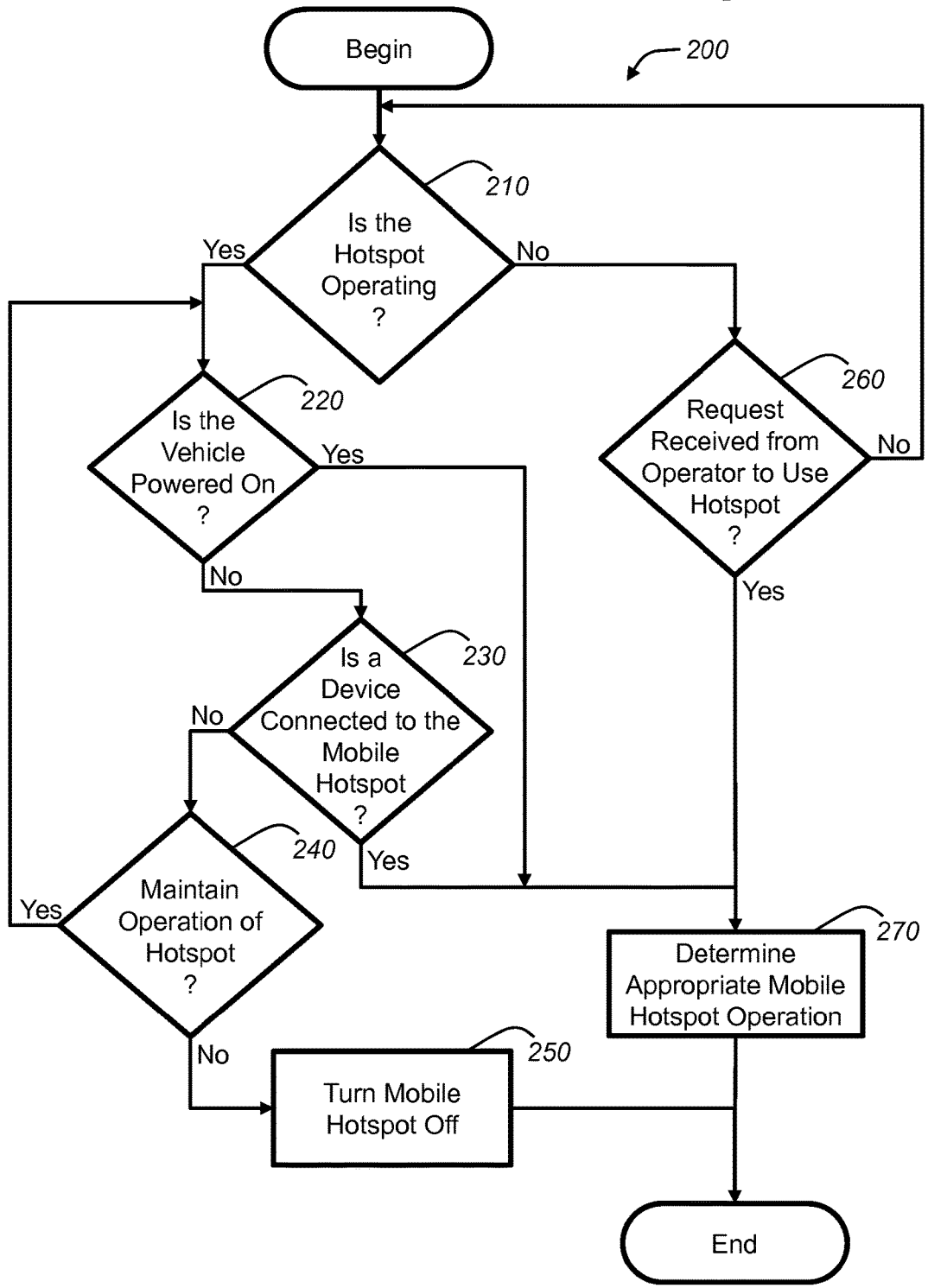
FIG. 2 is a flowchart illustrating a method of operating a mobile hotspot at a vehicle.

Turning now to FIG. 2, there is shown a method 200 of operating the mobile hotspot at a vehicle 12. This method determines whether to operate the mobile hotspot while the vehicle is off based on various vehicle conditions discussed below. Those vehicle conditions are grouped and categorized and discussed in additional detail further below in connection with FIG. 4.

Method 200 begins with step 210, wherein it is determined whether the hotspot is currently operating. As described above, router 30 is communicatively linked to telematics unit 50 which can provide Internet access thereto via wireless communication system 14. Router 30 provides a wireless access point whereto one or more wireless devices 90 or 94 can connect. This combination of components can thereby provide wireless access to the Internet for wireless devices. Therefore, if the router is off then it can be said that the mobile hotspot is not operating. Similarly, if the telematics unit 50 is off then Internet access might not be available even if the mobile hotspot is operating. Controller 40 can determine whether router 30 or telematics unit 50 is on or off. In one embodiment, controller 40 stores in memory the current state of router 30 (e.g., "on," "off," "on with device connected"). Accordingly, the determination of whether the hotspot is currently operating may be carried out by simply querying the memory as to the current state of router 30. In another embodiment, controller 40 could simply try to communicate with router 30 and, if router 30 does not respond, then controller 40 can infer that the router is currently off. If it is determined that router 30 is off and, thus, the mobile hotspot is not operating, then step 260 is carried out; otherwise, step 220 is carried out.

In step 220, it is determined whether the vehicle is powered off. Herein, "powered off" means that vehicle electronics 20 is currently not fully powered for propelling (i.e. driving) vehicle 12 and that it is not in an accessory mode (which is used on some vehicles to provide power to certain portions of the vehicle electronics 20). In the case of internal combustion engine vehicles, "powered off" may mean that vehicle 12 has its ignition off. In the case of electric vehicles, "powered off" may mean that the vehicle's powertrain is "turned off." Vehicle 12 may determine that it is powered off by receiving a signal from a body control module, an ignition module, or any other vehicle module that may indicate that vehicle 12 is currently powered off. If it is determined that vehicle 12 is not powered off (i.e., is "powered on") then step 270 may be carried out. Otherwise, step 230 is carried out.

In step 230, it is determined whether a wireless device is connected to the mobile hotspot. Router 30 may determine if it currently has an established connection with one or more devices 90 or 94 through determining if it currently has an IP address assigned to a MAC address of a device. Similarly, router 30 may provide information, such as its routing table, to controller 40. Controller 40 may then determine if the router is currently connected to a device 90 or 94. If it is determined that no device 90 or 94 is currently connected to router 30, then in some embodiments it may be desirable to turn the mobile hotspot off, in which case the process may move from step 230 directly to step 250. In other embodiments, it may be desirable to continue operation of the hotspot at least for which a period of time, in which case step 240 may be carried out. Otherwise, if it is determined that there is at least one device 90 or 94 connected to the mobile hotspot, then the process moves to step 270.

In step 240 it is determined whether to maintain operating the hotspot even though the vehicle is off and no devices are currently connected to it. This may involve determining if there is a mobile hotspot "override option" satisfied or whether a wait timer is not expired. Satisfaction of the "override option" may indicate that there is some extenuating reason to not turn off the mobile hotspot and/or that a user-selectable vehicle configuration option has been or is currently being met and, therefore, the mobile hotspot should remain in operation. One example of an "extenuating reason" to not turn off the mobile hotspot may include the occurrence of learned vehicle operator or other user behaviors that support the inference of the operator's desire to maintain operation of the mobile hotspot. For example, vehicle 12 may recognize that the operator usually has device 90 connected to the mobile hotspot at, or around, the current time of day. Although there is no device currently connected, controller 40 may direct router 30 to remain in operation if battery 24 has more than a certain amount of charge (see step 276).

In another embodiment, the mobile hotspot may be maintained operating in accordance with one or more user-selectable vehicle configuration options. Possible examples of "user-selectable vehicle configuration options" include maintaining the mobile hotspot operating based on one or more of the following: the vehicle's geographic location, time of day, and/or configuration of the vehicle to operate the mobile hotspot as much as is practicable in view of battery's state of charge and other necessary vehicle functions. In one example of how a user-selectable vehicle configuration option may be set, a vehicle operator may use touchscreen capabilities of visual display 38 to configure vehicle 12 to continue to operate the mobile hotspot if vehicle 12 is at or near one or more certain geographic locations (e.g., latitudinal and longitudinal coordinates, or street addresses) (see condition 332 in FIG. 4 below). This may be carried out by the vehicle operator navigating the touch screen of visual display 38, and then selecting an option to record the current geographic location of vehicle 12. Vehicle 12 may retrieve its current geographic coordinates from GPS module 80. Upon retrieving the coordinates, the vehicle may save the user-selectable vehicle configuration option into memory. Or, the user may input an address or select a point of a map presented on visual display 38. Then, when the step 240 is reached, vehicle 12 may carry out operation of the mobile hotspot in accordance with the saved geographic or other user-selectable vehicle configuration option(s). Here, for example, vehicle 12 may continue to operate the mobile hotspot automatically when the vehicle both reaches step 240 and is at or near the saved geographic coordinates that were configured as part of the user-selectable configuration option.

In yet another embodiment of step 240, a wait timer may be used when the vehicle changes from powered on to powered off (see condition 334 below). Here, this may allow the operator a certain amount of time to connect a device to the mobile hotspot before the hotspot will turn off. This may be useful in the event that a vehicle operator arrives at location 16 and then desires to connect a device 94 that is at that location (e.g., a desktop computer at the operator's residence) to the mobile hotspot. If there was no timer and no device was connected to the hotspot, the mobile hotspot would turn off at nearly the same time the vehicle is powered off. This wait timer may also be useful in allowing the operator time to connect the external charging device 18 to the charging port 22, in which case step 240 may also include checking to see if the charging device is connected. If so, the process may move to step 220 where the mobile hotspot may continue operating. In this way, as long as the charging device is connected within a certain amount of time, the hotspot will continue operation. This option may be used in conjunction with other vehicle options or conditions such as geographical location as discussed above.

The wait timer may be in the form of a timer that starts counting down from a fixed or adjustable wait time of, for example, ten minutes. Alternatively, expiration of the wait time may be determined by storing the time the vehicle was last powered off ("initial time") and comparing the current time to the initial time to determine if the difference exceeds the wait time. In either case this determination may be made by controller 40. Upon the method reaching step 240, the controller may then determine if the timer has reached zero; or, in the latter case, the controller may subtract the time the vehicle was last powered off ("initial time") from the current time and then make a determination based on the difference thereof and the wait time. In another example, the "initial time" may be the time when the vehicle receives a request to use the hotspot (see step 260). In this way, if the hotspot is turned on in response to an operator request, it can remain on until either a connection is made to the router 30 from device 90 (or from some other wireless device, such as device 94) or until the wait time expires. In any event, if it is determined that either an "override option" is satisfied or that the wait timer has not expired, then the method returns to step 220. Otherwise, step 250 is carried out.

In step 250, the mobile hotspot is turned off; that is, the operation of the mobile hotspot is terminated. Controller 40 may turn off router 30 by sending it a signal to do so or by cutting or restricting power to it from battery 24. Alternatively, or additionally, telematics unit 50 and/or router 30 may be turned off by themselves or by another module of vehicle electronics 20. After the mobile hotspot is turned off, the method ends.

Step 260 is carried out if in step 210 it is determined that the mobile hotspot is not operating. In step 260, it is determined whether a request was received from a vehicle operator, other person, or device 90 via application 92 to use the mobile hotspot. In one embodiment, an operator may navigate a user interface displayed on visual display 38 thereby indicating the operator's desire to use the mobile hotspot (see condition 342 in FIG. 4 below). In another embodiment, the operator may speak into microphone 36 or press button 34 in a way that indicates to the vehicle the operator's desire to use the mobile hotspot. In another embodiment, or as part of the previously described embodiments, vehicle 12 may prompt one or more operators to indicate whether they desire to use the mobile hotspot. This may be done automatically when the vehicle is being switched to a powered off condition, either each time it is powered off or only when there is currently a device connected to and/or using the mobile hotspot. The operator(s) may then use one of the previous means of responding to the prompt and/or may use any other vehicle user interface of vehicle 12. Or, application 92 may be used in device 90 to request operation of the mobile hotspot (see condition 344 below). Or, a web portal accessible via computer 74 may be used to request operation of the mobile hotspot (see condition 346 below). If it is determined that a request was received, then step 270 may be carried out. Otherwise, the method may return to step 210.

Figure 3:
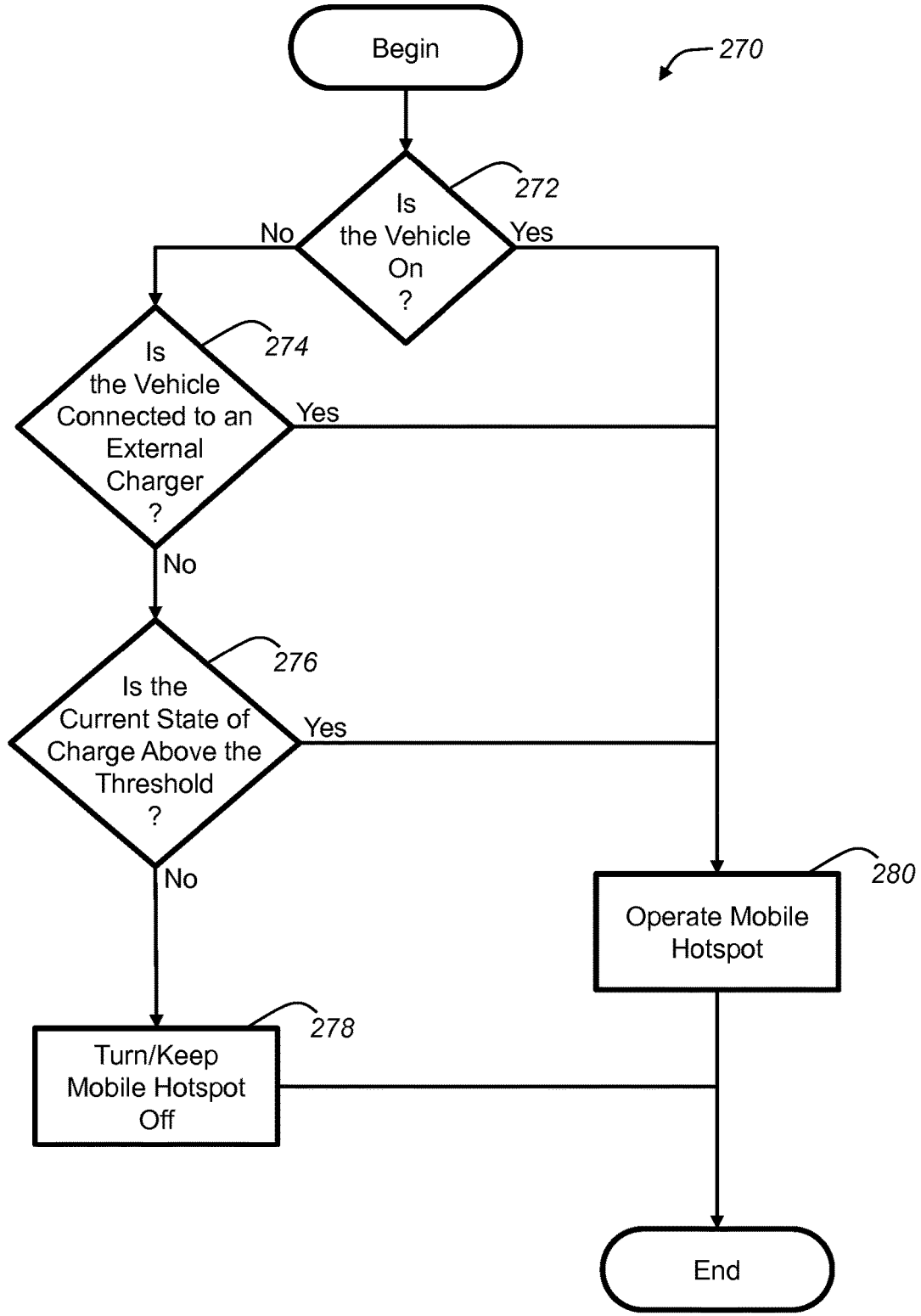
FIG. 3 is a flowchart illustrating a detailed embodiment of a step from the method illustrated in FIG. 2.

In step 270, the appropriate operation of the mobile hotspot is determined and carried out. Referring now to FIG. 3, there is illustrated one embodiment of step 270. At step 272, it is determined whether the vehicle is powered off. The determination made in this step is synonymous with that of step 220 and, therefore, the description of step 220 and all of its embodiments are applicable to carry out step 272 as well. If it is determined that vehicle 12 is on, then step 280 may be carried out. Otherwise, step 274 is carried out.

In step 274, it is detected that, while powered off, the vehicle is connected to an external power source that provides sufficient power to the vehicle to operate at least a portion of the vehicle electronics needed to run router 30 and controller 40. In one embodiment, vehicle 12 may detect that it is connected to external charging device 18 via detection of a threshold voltage or current being applied to battery 24. This can be done via charging circuit 26. Alternatively, charging circuit 26 can detect this connection to charging device 18 in other ways, such as by energization of the charging circuit by the charging device 18. In another embodiment, vehicle 12 may detect that it is connected to external charging device 18 through the combination of a switch or sensor and detection of at least a threshold amount of voltage or current provided through charging port 22. Here, a connector at the end of the cord of external charging device 18 may depress a switch when it is securely engaged to charging port 22, thereby enabling detection by vehicle 12 that the vehicle is currently connected to the external charging device.

In some embodiments detecting that the vehicle battery is charging may be sufficient to then move the process flow to step 280. In other embodiments, it may be desired to confirm that there is sufficient charging being carried out to operate the hotspot. For this, the charging voltage and/or current may be measured, thereby permitting the vehicle to determine the amount of power supplied by external charging device 18. For example, vehicle 12 may use a processor to calculate the power (i.e. Watts) supplied by multiplying the current by the voltage. Vehicle 12 may then compare this value to determine if the power supplied is enough to provide sufficient power to vehicle 12 to operate at least a portion of vehicle electronics 20 needed to provide the mobile hotspot.

The amount of sufficient power may be a threshold number that is preprogrammed into memory of one or more modules of vehicle electronics 20. For example, the vehicle manufacturer may determine that ten Watts are needed to provide sufficient power to vehicle electronics 20 to operate the mobile hotspot. This amount may then be compared with the detected power (as calculated above) to determine if the amount provided is enough to power vehicle electronics 20 such that the mobile hotspot may be operated. Alternatively, if it is determined that vehicle 12 is not connected to an external power source, vehicle 12 may power off wireless router 30 and/or controller 40, thereby shutting down operation of the mobile hotspot. Telematics unit 50, if operating to communicate with cell tower 70 may be switched off or into a low power or discontinuous receive mode if not needed by other vehicle systems or functions.

In another embodiment, the vehicle may determine that the battery is in a "low vehicle battery state" whereby termination of the mobile hotspot is therefore desired (see condition 326 below). A "low vehicle battery state" may be any state of the battery relating to any one of the following: a low state of charge of the battery; a temperature of the battery outside a certain range (i.e. too high or too low); a state of low current/voltage retention; etc. Means known to those skilled in the art may be used to determine whether battery 24 is in a low vehicle battery state. For example, the health of battery 24 may be compared to requisite health characteristics desired and/or needed to operate the mobile hotspot. The requisite health characteristics may be stored in memory of controller 40, or in another memory medium of vehicle 12. If it is determined that the health of battery 24 does not meet the required health characteristics, then it may be said that battery 24 is in a low vehicle battery state. In any case, if it is determined that the battery is fully charged, or nearly fully charged, then this information may be enough for the vehicle to conclude that there is sufficient power being provided to the vehicle to operate at least a portion of the vehicle electronics needed to operate the mobile hotspot and provide wireless access to the vehicle or Internet. This is because the charger may not charge the battery when its state of charge is above 98%, for example. Consequently, if it is determined via any of the above described embodiments that the vehicle is connected to an external power source and/or enough power is being supplied to power at least a portion of the vehicle electronics needed to operate the mobile hotspot, then step 280 may be carried out; otherwise, step 276 may be carried out.

In step 276, it is determined if the current state of charge of battery 24 is above a threshold value. In the illustrated embodiment, this step is only carried out when vehicle 12 is powered off; however, it may be useful, in cases where vehicle 12 is an electric vehicle (EV), to ensure the battery state of charge is above a threshold state of charge value such that the vehicle can maintain enough charge to provide propulsion and/or perform other necessary functions. Controller 40 may receive information from a device that is configured to measure the state of charge of battery 24. Such devices may be a part of the charging circuitry 26 or charging port 22. In any event, the appropriate device may then report or respond to controller 40 thereby indicating the voltage and/or other properties relating to the state of charge of battery 24. The current state of charge can then be compared to a threshold state of charge value that is stored in a memory in vehicle 12. Controller 40's processor, or another processor, may perform this comparison and, upon the detection that the current state of charge exceeds the threshold state of charge value, step 280 may be carried out. Otherwise, if the current state of charge is too low (i.e. below the threshold state of charge value), then step 278 may be carried out.

In step 278, the mobile hotspot is maintained off or, if currently running, is powered off. Upon reaching this step, it must have been determined that (1) the vehicle is powered off; (2) the vehicle is not connected to an external power source; and (3) the battery contains a state of charge below the threshold state of charge value. Thus, the mobile hotspot at this step is turned off to help preserve the state of charge of the battery. This is useful because if the mobile hotspot were to keep running, it would require power from the battery and, therefore, may place the battery in a state wherein it does not have enough power to start or propel the vehicle and/or perform other more imperative functions. This step is similar to step 250, wherein the mobile hotspot is turned off. All embodiments with respect to step 250 shall be applicable here to turn off the mobile hotspot. In the case where the mobile hotspot is already off, the vehicle may not need to perform any function except as to send a turn off signal to router 30 (which would turn router 30 off if it was on) and/or ensure that router 30 is off via attempting to communicate with the router. Step 270 then ends, and so does method 200.

In step 280, the mobile hotspot is powered on or maintained operating if already on. Upon reaching this step, it must have been determined that (1) the vehicle is on and there was a request to use the mobile hotspot; (2) the vehicle is off and connected to an external power source; or (3) the vehicle is off and the current state of charge of the battery is above a threshold state of charge value. In the case that the vehicle reached this step via (1), it may be desirable to enable the mobile hotspot to meet the operator's request without checking the vehicle battery state, especially in a hybrid vehicle where there is supplemental power available. However, in other embodiments, it may be desirable to ensure the state of charge of the battery is above a threshold amount as well (see step 276) because electric vehicles may not be able to maintain or charge a battery while powered on and/or when propelling the vehicle. In the case that the vehicle reached this step via (2), the battery is connected to an external power source and, therefore, there would probably be no concern with draining the battery. Similarly, in the case that the vehicle reached this step via (3), although the battery is not currently coupled to a power and/or charging means, the state of charge of the battery is sufficiently high such that the vehicle electronics may be powered to operate the mobile hotspot. In the case of reaching this step via (2) or (3), the vehicle may inform one or more vehicle operators or occupants via PFAF 58 or audio system 56 that the vehicle intends to continue operation of the mobile hotspot, even though the vehicle is off.

In any event, in one embodiment of step 280, controller 40 may turn on router 30 through activation of a switch that is between the router and the battery or by sending router 30 a command to start operation. Step 270 of method 200 then ends and, consequently, so does method 200. Nonetheless, method 200 may begin again upon reaching an endpoint, such as after steps 250 and 270 (i.e. detailed steps 278, 280 contained therein) such that it is carried out in a continuous loop.

As will be appreciated by those skilled in the art, FIGS. 2 and 3 provide various vehicle conditions under which operation of the mobile hotspot is desired when the vehicle is powered off. In some embodiments, only a single one of these vehicle conditions is required to initiate or maintain operation of the mobile hotspot while the vehicle is off. In other embodiments, two or more conditions may be required. The different types or categories of vehicle conditions discussed above include: vehicle electronics state, vehicle settings, and vehicle inputs. The different vehicle electronics states include states related to: whether battery 24 is being charged (e.g., whether the external charging device 18 is connected to the vehicle 12), whether there is a wireless device (such as device 90 or 94) connected to the mobile hotspot, and whether the battery state of battery 24 is OK. Other vehicle electronics state may include a state relating to any module or device of vehicle electronics 20. The different vehicle settings include settings based on: one or more geographic locations, the current time of day, and a wait timer. Other vehicle settings may be set based on other internal or external vehicle properties. The different vehicle inputs include: a user request via a vehicle user interface, a user request via device 90, and a user request via a web portal. Other vehicle inputs may be requests received at vehicle 12 via any other suitable wireless communication means.

Referring now to FIG. 4, there is shown a generalized method 300 of operating a mobile hotspot at a vehicle. The methods of FIGS. 2 and 3 discussed above provide one example of a specific implementation of this method 300. The method 300 is carried out when vehicle 12 is powered off and one or more vehicle conditions are satisfied. First, at step 310, a determination is made as to the vehicle condition(s) for which the mobile hotspot is to be operated while the vehicle is powered off. The determination may involve only detecting the presence of one vehicle condition, or may be made based on one or more vehicle conditions from any of the three types of vehicle conditions (320, 330, and 340). The satisfaction of one or more vehicle conditions will be used as a basis for operating the mobile hotspot, as will be described in step 350. As shown, the three types of vehicle conditions depict two or three examples of which operation of the mobile hotspot may be based on while the vehicle is powered off. There may be other vehicle conditions used for any particular implementation.

There are three conditions depicted in vehicle electronics state 320. As stated previously, the presence of one or more of the conditions 322-326 may be used as a basis for operating the mobile hotspot while the vehicle is off. For example, the determination as to the presence of condition 322, which is whether or not the battery 24 is connected to external charging device 18, may be made. The determination of this condition 322 may be made in any manner with respect to the synonymous determination made in step 274 of method 200. Also, the determination of the presence of conditions 324 and 326 may be made in any manner described above with respect to steps 230 and 276, respectively. As for condition 326, the determination may be based on battery state of charge, or on different battery conditions or properties, such as the battery temperature and/or charge retention capabilities, in lieu of or in addition to whether the current state of charge of battery 24 is above a threshold amount.

There are three conditions depicted in vehicle settings 330. These conditions all relate to certain preprogrammed vehicle settings and/or user-selectable vehicle configuration options. Condition 332 relates to the setting of one or more certain geographic locations (which, as described above in step 240, may be set using the vehicle's GPS module to capture latitudinal and longitudinal coordinates of the vehicle or may be set according to one or more addresses inputted by the user via visual display 38, or via a touch input on the display 38 indicating a location on a displayed map). It may be desirable to base the operation of the mobile hotspot on this geographic condition 332 because this will enable operation of the mobile hotspot at certain locations, such as location 16, wherein Internet access may not otherwise be provided. The embodiments of step 240 above that relate to geographic coordinates may be implemented here for purposes of determining the vehicle condition 332 is met. With respect to condition 334, it may be desirable to set a condition that allows the operation of the mobile hotspot to continue for a certain amount of time after the vehicle is turned off. This may be useful where a user may wishes to have the mobile hotspot run for a few minutes after the vehicle is turned off such that he/she could plug the vehicle into the external charging device while operation of the mobile hotspot is maintained. The embodiments described above in step 240 that relate to a wait timer may be applicable here as well.

The last type of vehicle condition depicted is vehicle input 340. In the illustrated embodiment, vehicle input 340 contains three conditions. All three of the conditions 342-346 shown are based on receiving a request from a user. The presence of condition 342 may be detected when vehicle 12 receives an indication via a vehicle user interface that the user desires to have the vehicle operate the mobile hotspot. For example, the user may navigate through menus on visual display 38 thereby indicating his or her desire to have the operation of the mobile hotspot start or continue. Further examples include those described in step 260 above with respect to vehicle user interfaces. In another embodiment, a request may be received via application 92. A user of device 90 may indicate their desire as to the operation of the mobile hotspot. Application 92 may then communicate to telematics unit 50 via wireless communication system 14. Alternatively, condition 346 represents the determination of the presence of a request that is received from a web portal. A user may use a device connected to the Internet, such as computer 74, to navigate a webpage that provides an interface to control vehicle functions and/or conditions. The user may then request that the vehicle initiates operation of or continues to operate the mobile hotspot. This request may then be sent from computer 74 to telematics unit 50 via land network 76, MSC 70, and cell towers 70. For more examples of how requests may be received, see step 260 of method 200 above. After the determination is made as to the presence of one or more vehicle conditions for which the mobile hotspot is to be operated while the vehicle is off, then step 350 is carried out.

In step 350, the mobile hotspot is operated while the vehicle is powered off based on those determinations made in step 310. As stated previously, the operation of the mobile hotspot may be based on one of the conditions in step 310 or may be based on any combination of the conditions described in step 310. For example, it may be desirable to configure the vehicle in such a way that while the vehicle is powered off, the mobile hotspot will continue to operate if both the vehicle is at one of the geographical locations (condition 332) and the wait timer has not expired (condition 334). Additionally, the vehicle may be configured to operate the mobile hotspot while the vehicle is powered off upon the determination that battery 24 is connected to external charging device 18. Therefore, upon the expiration of the wait timer (condition 334), if battery 24 is connected to charging device 18, the operation of the mobile hotspot will continue (see step 280); alternatively, if battery 24 is not connected to device 18 then, upon expiration of the wait timer, operation of the mobile hotspot will be terminated (see step 250).

In another embodiment of step 350, the operation of the mobile hotspot depends on whether a request as to the operation of the mobile hotspot is received. For example, a user of application 92 who is at location 16 may desire to have the vehicle operate the mobile hotspot such that desktop computer 94 may be able to access the Internet via the hotspot. Similarly, in yet another embodiment, the hotspot may be terminated if the battery falls to a lowered state (see step 276 of method 200 above). In any event, method 300 then ends, but may begin again upon reaching an endpoint, such that it is carried out in a continuous loop.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of operating a mobile hotspot at a vehicle, wherein the vehicle includes vehicle electronics that include a mobile hotspot which operates to provide wireless connectivity for one or more non-vehicle wireless devices located in the vehicle or within a proximity of the vehicle, wherein the method is carried out by the vehicle electronics and comprises the steps of:
   (a) determining whether a vehicle battery used to power the mobile hotspot is connected to an external charging device that supplies charging power to the vehicle battery, the external charging device being located at a fixed geographical location;
   (b) determining whether at least one of the one or more non-vehicle wireless devices are connected to the mobile hotspot;
   (c) operating the mobile hotspot while the vehicle is powered off based on the determinations in step (a) and step (b), wherein the mobile hotspot is operated when it is determined that the vehicle battery used to power the mobile hotspot is connected to the external charging device that supplies charging power to the vehicle battery, and when it is determined that the at least one non-vehicle wireless devices are connected to the mobile hotspot; and
   (d) turning off the mobile hotspot when it is determined that the vehicle battery used to power the mobile hotspot is not connected to the external charging device that supplies charging power to the vehicle or when it is determined that none of the one or more non-vehicle wireless devices are connected to the mobile hotspot.

2. The method of claim 1, wherein the determination in step (a) further comprises receiving a user request to operate the mobile hotspot.

3. The method of claim 2, wherein receiving the user request further comprises receiving the user request via a software application installed on a non-vehicle device.

4. The method of claim 1, wherein the determination in step (b) further comprises determining that the at least one non-vehicle wireless devices are connected to the mobile hotspot when the vehicle is switched from being powered on to being powered off, and wherein step (b) further comprises receiving a user request to continue operation of the mobile hotspot.

5. The method of claim 1, wherein the determination in step (a) further comprises determining that one or more conditions of a user-selectable vehicle configuration option are met.

6. The method of claim 5, wherein the user-selectable vehicle configuration option includes one or more geographic locations and wherein the user-selectable vehicle configuration option causes the vehicle electronics to operate the mobile hotspot while the vehicle is powered off when the vehicle is at one of the one or more geographic locations.

7. The method of claim 1, further comprising the step of subsequently terminating operation of the mobile hotspot based on determining that the vehicle battery is in a low battery state.

8. A method of controlling operation of a mobile hotspot at a vehicle, comprising the steps of:
   (a) operating a mobile hotspot at the vehicle while the vehicle is powered on, wherein the vehicle includes vehicle electronics that include the mobile hotspot which provides wireless connectivity for one or more non-vehicle wireless devices located in the vehicle or within a proximity of the vehicle;
   (b) subsequently after step (a), maintaining operation of the mobile hotspot for a period of time after the vehicle is powered off;
   (c) detecting that the vehicle is connected to an external power source during operation of the mobile hotspot for the period of time after the vehicle is powered off, the external power source being located at a fixed geographical location and being separate from the vehicle electronics; and
   (d) continuing to operate the mobile hotspot in response to step (c) such that the operation of the mobile hotspot is continued after the vehicle is powered off when the vehicle is connected to the external power source within the period of time after the vehicle is powered off.

9. The method of claim 8, wherein step (b) further comprises determining that at least one of the one or more non-vehicle wireless devices is connected to the mobile hotspot and maintaining operation of the mobile hotspot in response to the determination irrespective of whether the vehicle is connected to the external power source.

10. The method of claim 9, further comprising the step of detecting that at least one of the one or more non-vehicle wireless devices has been disconnected from the mobile hotspot and, subsequently, terminating operation of the mobile hotspot.

11. The method of claim 8, further comprising prompting an operator of the vehicle upon the vehicle powering off, to request an input indicating if the vehicle should continue operate the mobile hotspot.

12. The method of claim 8, further comprising providing a notification to an operator of the vehicle upon the vehicle powering off that the vehicle will continue to operate the mobile hotspot.

* * * * *